(12) United States Patent
Wen et al.

(10) Patent No.: US 10,890,958 B2
(45) Date of Patent: Jan. 12, 2021

(54) CENTRALIZED POWER METER AND CENTRALIZED POWER CALCULATION METHOD

(71) Applicant: Telefonaktiebolaget LM Ericsson (Publ), Stockholm (SE)

(72) Inventors: Gan Wen, Beijing (CN); Ge Huang, Beijing (CN); Kaifeng Zhang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 401 days.

(21) Appl. No.: 15/757,978

(22) PCT Filed: Sep. 9, 2015

(86) PCT No.: PCT/CN2015/089235
§ 371 (c)(1),
(2) Date: Mar. 7, 2018

(87) PCT Pub. No.: WO2017/041241
PCT Pub. Date: Mar. 16, 2017

(65) Prior Publication Data
US 2018/0253133 A1     Sep. 6, 2018

(51) Int. Cl.
*G06F 1/28*     (2006.01)
*H04W 52/04*     (2009.01)
(Continued)

(52) U.S. Cl.
CPC ............ *G06F 1/28* (2013.01); *G05B 15/02* (2013.01); *H04B 17/14* (2015.01); *H04B 17/18* (2015.01);
(Continued)

(58) Field of Classification Search
CPC .......... G06F 1/28; H04W 52/04; H04B 17/14; H04B 17/18; H04B 17/318; G05B 15/02; H02J 13/00
See application file for complete search history.

(56) References Cited

U.S. PATENT DOCUMENTS 7,236,897 B2    6/2007  Gandhi
7,657,883 B2 *  2/2010  Jensen .................. G06F 9/3802
                                              717/161
(Continued)

FOREIGN PATENT DOCUMENTS

CN         1627650 A     6/2005
CN       101815348 A     8/2010
(Continued)

OTHER PUBLICATIONS

International Search Report and Written Opinion for International Patent Application No. PCT/CN2015/089235, dated May 27, 2016, 6 pages.
(Continued)

*Primary Examiner* — Mohamed Charioui
(74) *Attorney, Agent, or Firm* — Sage Patent Group

(57) ABSTRACT

The present disclosure provides a centralized power meter for a signal processing circuit, comprising: M sample buffers, each configured to buffer samples respectively from at least one of N sources, and trigger a request for power calculation of the buffered samples in response to the buffered samples, the request having a corresponding priority; a switch, configured to route the requests from the M sample buffers to one or more power calculation cores; the one or more power calculation cores, each configured to retrieve the samples from the sample buffer in an order of their corresponding priorities, in response to the routed requests, and to perform power calculation of the retrieved samples, wherein N and M are integers no less than 1, and
(Continued)

N is no less than M. The present disclosure further provides a centralized power calculation method.

18 Claims, 6 Drawing Sheets

(51) Int. Cl.
    *G05B 15/02*     (2006.01)
    *H04B 17/14*     (2015.01)
    *H04B 17/318*     (2015.01)
    *H04B 17/18*     (2015.01)
    *H02J 13/00*     (2006.01)

(52) U.S. Cl.
    CPC .......... *H04B 17/318* (2015.01); *H04W 52/04* (2013.01); *H02J 13/00* (2013.01)

(56) References Cited

U.S. PATENT DOCUMENTS

| | | | |
|---|---|---|---|
| 8,676,393 | B1 | 3/2014 | Hupton et al. |
| 9,081,501 | B2* | 7/2015 | Asaad ................ G06F 12/0862 |
| 2004/0122833 | A1 | 6/2004 | Forth et al. |
| 2007/0091104 | A1* | 4/2007 | Singh ................. G06F 13/1663 |
| | | | 345/531 |
| 2008/0123525 | A1* | 5/2008 | Miyoshi ................ H04L 49/602 |
| | | | 370/230 |
| 2008/0192874 | A1 | 8/2008 | Lim et al. |
| 2008/0320240 | A1* | 12/2008 | Savic ................... G11C 7/1075 |
| | | | 711/151 |
| 2012/0331278 | A1* | 12/2012 | Breternitz ............ G06F 9/5027 |
| | | | 712/236 |
| 2014/0223053 | A1* | 8/2014 | Yoshida .............. G06F 13/1689 |
| | | | 710/110 |
| 2015/0222373 | A1 | 8/2015 | Tanaka et al. |
| 2016/0134109 | A1* | 5/2016 | Kogo ........................ H02J 1/14 |
| | | | 307/24 |

FOREIGN PATENT DOCUMENTS

| | | |
|---|---|---|
| CN | 202434037 U | 9/2012 |
| WO | 2010111738 A1 | 10/2010 |
| WO | 2013037299 A1 | 3/2013 |
| WO | 2013148671 A1 | 10/2013 |
| WO | 2014040608 A1 | 3/2014 |
| WO | 2014199380 A1 | 12/2014 |

OTHER PUBLICATIONS

Extended European Search Report—15903348.9—dated May 3, 2019—8 Pages.

* cited by examiner

CENTRALIZED POWER METER AND CENTRALIZED POWER CALCULATION METHOD

This application is a 35 U.S.C. § 371 national phase filing of International Application No. PCT/CN2015/089235, filed Sep. 9, 2015, the disclosure of which is incorporated herein by reference in its entirety.

TECHNICAL FIELD

The present disclosure generally relates to the technical field of telecommunication, and particularly to a centralized power meter and a centralized power calculation method for a plurality of digital sample sources.

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

During digital signal processing, many power meters may be used for power metering, which is required for various purposes, such as power gain control, signal glitch suppression, debug etc.

FIG. 1 illustratively shows a schematic structure diagram of a conventional power meter. As shown in FIG. 1, the power meter 100 may comprise: a sampling unit 101 for obtaining samples from a power metering source ("source" for short, the same below); a sample buffer 103 for buffering the samples from the source and triggering a request for power calculation of the buffered samples in response to the buffered samples; a power calculation engine 105 for retrieving the samples from the sample buffer in response to the request and performing power calculation of the retrieved samples.

The sample buffer 103 may be optional. That is, samples output from the sampling unit 101 may be directly transmitted to the power calculation engine 105, and the power calculation engine 105 may perform power calculation of the retrieved samples.

The power calculation engine 105 is the core of the power meter 100, in which an average power may be calculated based on T I/Q samples from the source. There are some necessary format conversions of the average power in practice, such as $P_{avg\_db}$ which may be calculated as shown in equations (1)-(3):

$$P_{total} = \Sigma_{t=0}^{T-1} I_t^2 + Q_t^2 \quad (1)$$

$$P_{avg} = P_{total}/T \quad (2)$$

$$P_{avg\_db} = 10 \log(P_{avg}) \quad (3)$$

where T represents the number of samples and is an integer no less than 1; $I_t$ and $Q_t$ are I and Q components of a t-th complex sample, respectively; $P_{total}$ represents a total power of the T I/Q samples; $P_{avg}$ represents an average power of the T I/Q samples; and $P_{avg\_db}$ represents the average power in logarithmic units (e.g., dB scale).

Clearly, the results of the calculations according to equations (1)-(3) will provide indicators of instantaneous signal power in the power metering period. A subsequent power metering period may start immediately after a current one, or after some delay has elapsed, whereby the indicator of the instantaneous power is refreshed. Such repeated power metering over consecutive periods may proceed during operation of the signal processing circuit, so that an up-to-date indicator of the instantaneous power at the source is available at all times. A measure of the total signal energy may be obtained by accumulating calculated power values for a plurality of power metering periods.

The power calculation engine is a main resource consumption part of the power meter.

Conventionally, the power meter may be inserted to any power trace point that needs the power metering.

FIG. 2 illustratively shows several exemplary power trace points where respective conventional power meters may be located as required in an exemplary TDD (Time Division Duplexing) digital front end signal processing circuit 200.

In the example as shown in FIG. 2, since signal processing on DUC (Digital Up Converter) 203 and DDC (Digital Down Converter) is carrier based, the power meters located on the power trace point 1 or 2 are per carrier per antenna. And since signal processing on CFR (Crest Factor Reduction) 206, a DPD (Digital Pre-Distortion) 208 and an ADC (Analog-Digital Converter) 207 is antenna based, power meters located on the power trace points 3-6 of are per antenna. Thus in this example, at least one power meter is located at each trace point for power metering. This is a typical distributed arrangement of power meters conventionally used in the signal processing circuit 200.

It is known that the amount of resources consumed by a single power meter is small. However, as the number of the supported antennas and the number of the carriers become bigger and bigger, more and more power meters are needed, and the total resource consumption of the power meters at the power trace point grows considerable. For example, assuming that the power trace point 1 before the DUC 204 supports 8 antennas and 3 carriers per antenna, there are at least 24 power meters needed for the power trace point 1, and these power meters may consume about 10% of chip resource.

Accordingly, in a case that there are many power trace points in the circuit which need power metering, and each of the power trace points need at least one (possibly many) power meter, the total resource consumption of the power meters in the whole circuit becomes considerable. Furthermore, the distributed arrangement of power meters in which at least one power meter is located at each trace point may negatively affect the size of the whole circuit.

Actually, the distributed arrangement of power meters as described above causes a waste of resource, since the power meters disposed on some power trace points may not be active at all times, e.g., in TDD, the power meters respectively for UL (Uplink)/DL (Downlink) work in different time slots; and generally, most of the power meters do not need to perform a full-time power metering.

Therefore, it is desired to share some part, especially the power calculation core, of the power meters in the circuit to reduce the number of the power calculation cores needed in the circuit, in order to reduce the resource consumption and the size of the circuit.

SUMMARY

Accordingly, an object of the present disclosure is to provide a centralized power meter and a centralized power calculation method for a plurality of sources, which may reduce the number of the power calculation cores needed in the circuit, and thus reduce the resource consumption and the size of the circuit.

A premise of proposing technical solutions of the present disclosure consists in that there is a possibility to share the power calculation core, at least because in TDD, the UL/DL works in different time slots, and the power meters respectively for the UL and for the UL do not work at all times;

generally, most of the power meters do not need to perform a full-time power metering;

a power calculation core of the power meter can work at a higher frequency than a sample rate of samples from a source whose power calculation is required to be performed by the power calculation core, so that multiple power calculation tasks can be supported on a single power calculation core.

Meanwhile, the technical solutions of the present disclosure should consider the fact that sharing the power calculation core needs to meet a processing latency requirement of the power meter. More precisely, some power meter, e.g. the power meter for the automatic gain control or variable control association purpose etc., needs its power calculation core to immediately get its power calculation result in a specified period once the last sample goes into the power calculation core, so as to avoid performance degrade; other power meters, e.g. a power meter for debugging purposes, are not latency-sensitive.

Therefore, the technical solutions of the present disclosure enable the shared power calculation core to handle different power calculation tasks with priorities, or in other words, to support QoS (Quality of Service).

In one aspect of the present disclosure, a centralized power meter is provided. The centralized power meter comprises: M sample buffers, each configured to buffer samples respectively from at least one of N sources, and trigger a request for power calculation of the buffered samples in response to the buffered samples (e.g., the presence of samples in the buffer), the request having a corresponding priority; a switch, configured to route the requests from the M sample buffers to at least one power calculation core; the at least one power calculation core, each of which is configured to retrieve the samples from the sample buffer in an order of their corresponding priorities, in response to the routed requests, and to perform power calculation of the retrieved samples. Here, N and M are integers no less than 1, and N is no less than M.

In an embodiment of the centralized power meter, samples from a plurality of sources which are sampled in different time periods share the same sample buffer.

In an embodiment of the centralized power meter, the switch is configured to route the requests from the M sample buffers to a plurality of power calculation cores according to a load balancing policy.

In an embodiment of the centralized power meter, each power calculation core comprises a Quality of Service (QoS) scheduler and a power calculation engine, wherein the QoS scheduler is configured to schedule the routed requests in the order of their corresponding priorities to select the routed requests one by one, and instruct the power calculation engine to serve selected request; and the power calculation engine is configured to retrieve, from the sample buffer, samples of which the request for power calculation is selected, according to the instruction of the QoS scheduler; and to perform the power calculation of the retrieved samples.

In an embodiment of the centralized power meter, the QoS scheduler is further configured to select the requests with the same priority in a round-robin way.

In an embodiment of the centralized power meter, the power calculation engine is further configured to retrieve, from the sample buffer, the samples of which the request for power calculation is selected and to perform the power calculation of the retrieved samples in a predetermined serving period of the power calculation engine; and the QoS scheduler performs a new round of scheduling at the end of the predetermined serving period.

In an embodiment of the centralized power meter, the power calculation core further comprises a calculation controller and a context memory, wherein the calculation controller is configured to determine whether a second request which is newly selected by the QoS scheduler at the end of the predetermined serving period is different from a first request which is currently served by the power calculation engine; and if the second request is different from the first request, to control the power calculation engine to store power calculation context for the first request in the context memory, and control the power calculation engine to load power calculation context for the second request to the power calculation engine from the context memory; and the context memory is configured to store, from the power calculation engine, the power calculation context for the request currently served by power calculation engine, under the control of the calculation controller.

In an embodiment of the centralized power meter, the context memory is configured to store the power calculation context of samples for the currently served request per source under the control of the calculation controller; and to clear the power calculation context of the samples for the currently served request per source under the control of the calculation controller, once the power calculation of all the samples from the source is completed.

An embodiment of the centralized power meter further comprises: a result memory, configured to store, per source, all of the power calculation results from the at least one power calculation cores.

In another aspect of the present disclosure, a Radio Frequency (RF) front end equipment comprising the centralized power meter as described above is provided.

In yet another aspect of the present disclosure, a centralized power calculation method for N sources is provided. The centralized power calculation method comprises steps of: buffering, in M sample buffers, samples respectively from the N sources; triggering, in response to the samples buffered in the M sample buffers, requests for power calculation of the buffered samples, each request having a corresponding priority; routing, by a switch, the requests from the M sample buffers to at least one power calculation core; retrieving, by each of the at least one power calculation core, the samples from the sample buffer in an order of their corresponding priorities, in response to the routed requests; and performing power calculation of the retrieved samples in the power calculation core, wherein N and M are integers no less than 1, and N is no less than M.

In an embodiment of the centralized power calculation method, samples from a plurality of sources which are sampled in different time periods share the same sample buffer.

In an embodiment of the centralized power calculation method, the step of routing comprises: routing the requests from the M sample buffers to a plurality of power calculation cores according to a load balancing policy.

In an embodiment of the centralized power calculation method, each power calculation core comprises a Quality of Service (QoS) scheduler and a power calculation engine, and wherein the step of retrieving the samples from the sample buffer in the order of their corresponding priorities in response to the routed requests comprises: scheduling, by the QoS scheduler, the routed requests in the order of their corresponding priorities to select the routed requests one by one; and instructing, by the QoS scheduler, the power calculation engine to serve selected request; and retrieving, by the power calculation engine, the samples of which the request for power calculation is selected from the sample buffer, according to the instruction of the QoS scheduler; and wherein the step of performing power calculation of the retrieved samples comprises: performing, by the power calculation engine, the power calculation of the retrieved samples.

In an embodiment of the centralized power calculation method, the step of scheduling the routed requests in the order of their corresponding priorities to select the routed requests one by one further comprises: selecting the requests with the same priority in a round-robin way.

In an embodiment of the centralized power calculation method, the steps of retrieving the samples of which the request for power calculation is selected and performing the power calculation of the retrieved samples are operated in a predetermined serving period of the power calculation engine; and the step of scheduling is performed at the end of the predetermined serving period.

In an embodiment of the centralized power calculation method, the power calculation core further comprises a calculation controller and a context memory, and wherein after the step of scheduling is performed to select a second request which is newly selected by the QoS scheduler in the new round of scheduling at the end of the predetermined serving period. The centralized power calculation method comprises:
determining, by the calculation controller, whether the second request is different from a first request which is currently served by the power calculation engine;
controlling, by the calculation controller, the power calculation engine to store power calculation context for the first request in the context memory, and to load power calculation context for the second request to the power calculation engine from the context memory, if the second request is different from the first request;
performing, by the power calculation engine, power calculation of a next sample for the second request;
determining whether the power calculation of the samples for the second request is completed;
deciding whether the serving period has expired, if it is determined that the power calculation of the samples for the second request has not completed;
repeating the steps of performing, determining and deciding, until it is decided that the serving period has expired; and
returning to the step of scheduling to select a new request.

In an embodiment of the centralized power calculation method, the power calculation context of samples for the currently served request is stored per source in the context memory. The centralized power calculation method further comprises:
outputting a power calculation result from the power calculation engine, and clearing, by the context memory, the power calculation context of the samples for the currently served request per source under the control of the calculation controller, if it is determined that the power calculation of the samples for the second request is completed.

An embodiment of the centralized power calculation method further comprises: storing, per source, all of the power calculation results from the at least one power calculation cores in a result memory.

The technical solutions of the present disclosure may at least have beneficial effects of:
reducing the number of the power calculation cores in the circuit by sharing some of power calculation cores, so as to reduce the resource consumption (in particular chip resources consumption) and/or reduce the size of the circuit;
allowing flexible load balancing; and
ensuring QoS to different power metering sources.

BRIEF DESCRIPTION OF THE DRAWINGS

The objects, advantages and characteristics of the present disclosure will be more apparent, according to descriptions of preferred embodiments in connection with the drawings, on which.

Figure 1:
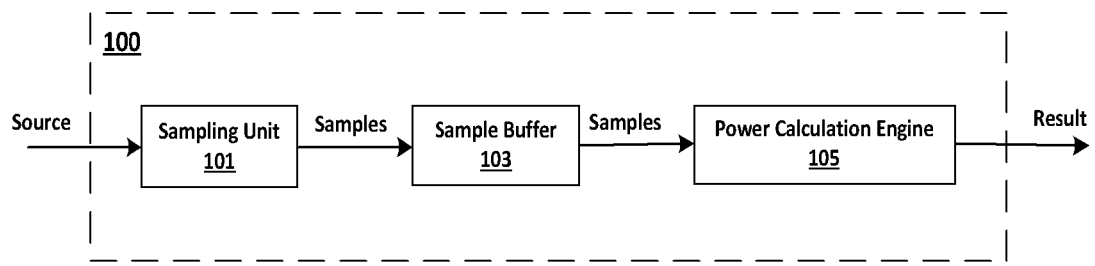
FIG. 1 illustratively shows a schematic structure diagram of a conventional power meter.
Figure 2:
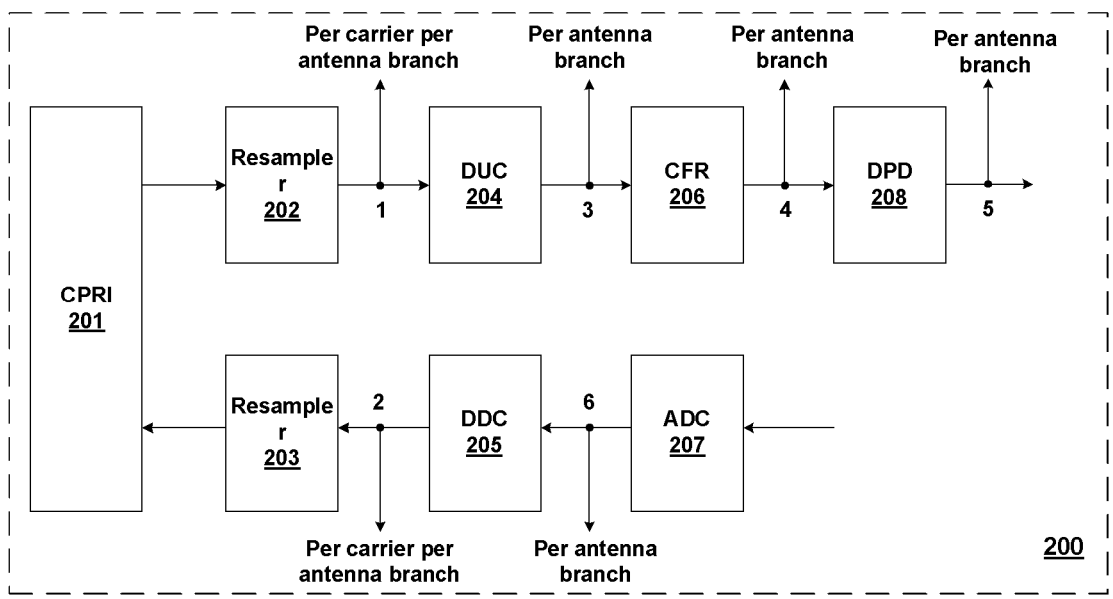
FIG. 2 illustratively shows several exemplary power trace points where respective conventional power meters of FIG. 1 may be distributedly located as required in an exemplary TDD digital front end signal processing circuit.

It should be noted that various parts in the drawings are not drawn to scale, but only for an illustrative purpose, and thus should not be understood as any limitations and constraints on the scope of the present disclosure.

DETAILED DESCRIPTION

In the discussion that follows, specific details of particular embodiments of the present techniques are set forth for purposes of explanation and not limitation. It will be appreciated by those skilled in the art that other embodiments may be employed apart from these specific details. Furthermore, in some instances detailed descriptions of well-known methods, nodes, interfaces, circuits, and devices are omitted so as not to obscure the description with unnecessary detail. Those skilled in the art will appreciate that some or all of the functions described may be implemented using hardware circuitry, such as analog and/or discrete logic gates interconnected to perform a specialized function, Application Specific Integrated Circuits (ASICs), Programmable Logical Arrays (PLAs), etc.

Hardware implementations of the presently disclosed techniques may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

Note that although exemplary embodiments of the present disclosure describe a centralized power meter and a centralized power calculation method applied in a digital signal processing circuit, the scope of the disclosure is by no means limited in this regard. Other circuits may also benefit from exploiting the ideas covered within this disclosure as appropriate when a centralized power meter and a centralized power calculation method can be applied.

Hereinafter, a structure of a centralized power meter according to an embodiment of the present disclosure will be described in detail with reference to FIG. 3.

Figure 3:
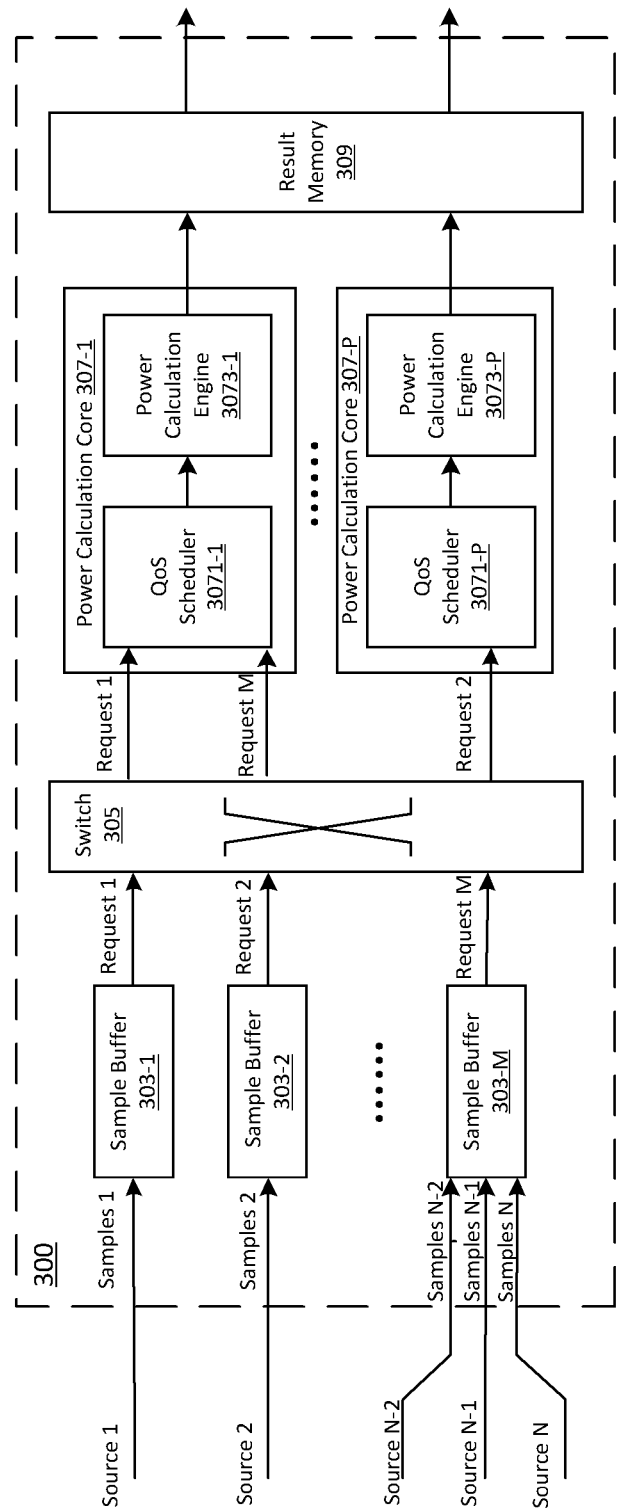
FIG. 3 illustratively shows a schematic structure diagram of a centralized power meter according to an embodiment of the present disclosure.

FIG. 3 illustratively shows a schematic structure diagram of a centralized power meter (or instantaneous power sensing device) 300 according to an embodiment of the present disclosure. It should be understood by the skilled in the art that the centralized power meter 300 in FIG. 3 only illustratively show elements contributing to the present disclosure, some well-known elements, such as a sampling unit in the power meter, are omitted in FIG. 3 in order not to obscure the structure diagram of the centralized power meter according to the present embodiment.

As shown in FIG. 3, the centralized power meter 300 comprises: M sample buffers 303-1 to 303-M, each sample buffer 303 being configured to buffer samples respectively from at least one of N power metering sources ("source" for short, the same below), and trigger a request for power calculation of the buffered samples in response to the buffered samples, the request having a corresponding priority;
a switch 305, configured to route the requests from the M sample buffers to P power calculation cores 307-1 to 307-P; the P power calculation cores 307-1 to 307-P, each power calculation core 307 being configured to, in response to the routed requests, retrieve the samples from the sample buffer 303 in an order of the corresponding priorities of the routed requests; and to perform power calculation of the retrieved samples,
wherein N, M and P are integers no less than 1, and N is no less than M, M is no less than P.

The N sources at respective power trace points are sources for which power calculation is required for various purposes in practice, such as power gain control, signal glitch suppression, debug etc. Different sources may have different requirements for obtaining their power calculation results. For example, the source at the power trace point for the automatic gain control purpose etc. needs to immediately get its power calculation result once the last sample goes into the power calculation core; unlike this, the source at the power trace point for the debug purpose is not sensitive to the time of obtaining its power calculation result.

Different power calculation requirements of the N sources may be well met by assigning a priority to each of the N sources. The priorities may be independently assigned to the respective N sources, according to the power calculation requirements of the respective N sources. The priority of the source is associated with a source ID of the source.

The skilled in the art should understand that similar to conventional power metering arrangements, the centralized power meter 300 further comprises N sampling units respectively for the N sources, although they are not shown in FIG. 3. Each sampling unit is configured to obtain, from one of the N sources, samples for which power calculation is required. In an example, the sampling unit may obtain the samples in a predetermined period on the source for which the power calculation is required. In the exemplary scenario of the present embodiment, the sampling unit may be an IQ sampling unit which performs an IQ sampling process. However, the skilled in the art may select an appropriate sampling unit in practice, which is not limited by the present disclosure.

The sampling unit may transfer the obtained samples to the sample buffer 303.

Typically, there may be one sample buffer 303 for the samples from each source. The sample buffers 303-1 and 303-2 respectively for the samples from Source 1 and Source 2 in FIG. 3 exemplarily show this case. Alternatively, for the samples from a plurality of sources which are sampled in different time periods, i.e., whose power calculation intervals are different, the samples from the plurality of sources may share the same sample buffer 303. Therefore in this case, the number of the sample buffers 303 in the centralized power meter may be reduced to be less than the number of the sources. The sample buffer 303-M for the samples respectively from Sources N−2, N−1 and N in FIG. 3 exemplarily show this case. It should be understood that a shared sample buffer may be used for samples from any plurality of sources, as long as the plurality of sources are required to be sampled in different time periods, which is not limited to the examples shown in FIG. 3.

For example, a single sample buffer may be shared by sources intended to serve a debugging purpose, since typically the sources with the debug purpose do not need power calculation in the same power calculation interval.

The sample buffer 303 may be used for buffering the samples before power calculation may be performed on the samples, and trigger a request for power calculation of the buffered samples in response to the buffered samples. The request may contain the source ID of the source from which the samples are obtained, and the corresponding priority associated with the source ID.

Size requirements of the sample buffers 303 for the sources with different priorities may be different. For example, for a source with a higher priority, the size of the sample buffer may be smaller, since the samples buffered will be retrieved soon to be calculated in the power calculation core; however, for a source with a lower priority, the size of the sample buffer should be sufficient to buffer all the samples during a power calculation period.

The sample buffer 303 may transfer the triggered request to the switch 305.

The switch 305 may route the requests from the M sample buffers 303-1, . . . , 303-M to a plurality of power calculation cores 307-1, . . . , 307-P according to a load balancing policy. In particular, the switch 305 may establish a connection between the sample buffer 303 and the power calculation core 307 according to a load balancing policy, and route the request received from the sample buffer 303 to the power calculation core 307 via the established connection. In the example as shown in FIG. 3, the switch 305 establishes connections between the sample buffer 303-1 and the power calculation core 307-1, between the sample buffer 303-M and the power calculation core 307-1, and between the sample buffer 303-2 and the power calculation core 307-P by taking the load balancing into account; and respectively route Requests 1 and M to the power calculation core 307-1 and route Request 2 to the power calculation core 307-P via the three connections. The switch 305 may support dynamically changing the connection between the sample buffer 303 and the power calculation core 307 based on the load balancing. It is very useful on the load sharing, i.e., the switch 305 may establish a connection to a power calculation core 307 with the least workload, or the switch 305 may change the connection from a heavy-loaded power calculation core to a relatively empty power calculation core.

It may be understood by the skilled in the art that in a specific example, there may be only one power calculation core 307 (i.e. P=1) in the centralized power meter, and all the requests from the M sample buffers 303 may be routed by the switch 305 to the power calculation core 307 with no load balancing policy needed.

The number P of the power calculation cores 307 depends on the capacity of the power calculation core simultaneously dealing with the requests from the M sample buffers 303. The power calculation cores 307 may be implemented as integrated circuits, or parts of a common integrated circuit, whereby the chip resource consumption normally is in a direct relationship with P.

The power calculation core 307 may retrieve the samples from the sample buffer 303 via the connection established by the switch 305, and may do so in an order of the corresponding priorities of the routed requests, in response to the requests routed to the power calculation core 307. The power calculation core 307 may then perform power calculation of the retrieved samples in accordance with above equations (1)-(3) or equivalent relationships.

In particular, the power calculation core 307 comprises a QoS scheduler 3071 and a power calculation engine 3073.

The QoS scheduler 3071 may schedule the requests routed to the power calculation core 307 in the order of the corresponding priorities of the routed requests to select the routed requests one by one, and instruct the power calculation engine 3073 to serve the selected request, which may comprise: retrieving, from the sample buffer 303, the samples of which the request for power calculation is selected, and performing the power calculation on the retrieved samples.

Then, the power calculation engine 3073 may retrieve, from the sample buffer 303, the samples of which the request for power calculation is selected and to perform the power calculation of the retrieved samples.

Generally, after the QoS scheduler 3071 selects the request for the power calculation engine 3073, the power calculation engine 3073 will serve the selected request for a predetermined period, which may be called a serving period. During the serving period, the power calculation engine 3073 may retrieve the samples corresponding to the request from the sample buffer, and perform the power calculation of the retrieved samples.

In practical applications, the scheduling process of the QoS scheduler 3071 is much quicker than the serving period of the power calculation engine 3073. Therefore, it may be considered that the QoS scheduler 3071 performs a new round of scheduling to select a new request for the power calculation engine 3073 at the end/start of each serving period of the power calculation engine 3073.

Taking the power calculation core 307-1 in FIG. 3 as an example, assuming that Request 1 has a higher priority and Request M has a lower priority, the QoS scheduler 3071-1 may schedule Requests 1 and M to firstly select Request 1 and instruct the power calculation engine 3073-1 to serve Request 1 in its serving period; and the power calculation engine 3073-1 may retrieve the samples of Source 1 from the sample buffer 303-1 and perform the power calculation of the retrieved samples in its serving period. Then, at the end of the serving period, the QoS scheduler 3071-1 may schedule to select Request M and instruct the power calculation engine 3073-1 to serve Request M in the next serving period; and the power calculation engine 3073-1 may retrieve the samples from the sample buffer 303-M and perform the power calculation of the retrieved samples in its next serving period.

Figure 4:
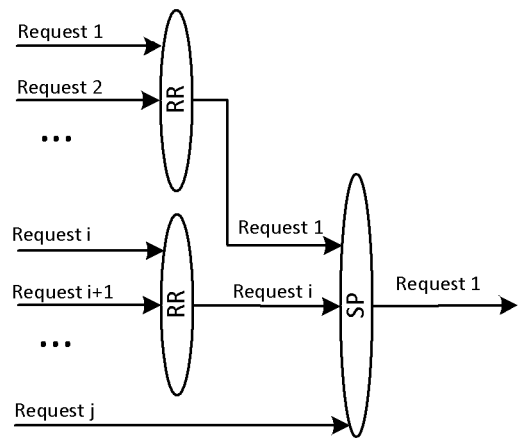
FIG. 4(a) illustratively shows a QoS scheduling mechanism of a QoS scheduler in a centralized power meter according to an embodiment of the present disclosure.
FIG. 4(b) illustratively shows a QoS scheduling sequence output by the QoS scheduler of FIG. 4(a)
Figure 4:

FIG. 4(a) illustratively shows a QoS scheduling mechanism of a QoS scheduler in a centralized power meter according to an embodiment of the present disclosure, and FIG. 4(b) illustratively shows a QoS scheduling sequence output by the QoS scheduler of FIG. 4(a).

As shown in FIG. 4(a), the QoS scheduler 3071 included in the power calculation core 307 has a two-level scheduling mechanism. On the first level, a plurality of requests are divided into several groups, each group consisting of the requests with the same priority; and one request is selected from each group using a round-robin (RR) method; and on the second level, the requests from the several groups with different priorities are selected in the order of their priorities using a strict priority (SP) method. In such a way, the QoS scheduler 3071 may schedule the plurality of requests routed to the power calculation core 307 in the order of the corresponding priorities of the plurality of requests to select the plurality of requests one by one, in which the requests with the same priority are selected in the RR way.

The example of FIG. 4(a) shows a plurality of requests being received in a time period, which may be regarded as a static scenario, i.e., no more requests are received in this time period. It is assumed that Requests 1, 2, . . . have the same high priority; Requests i, i+1 . . . have the same medium priority; and Request j has a low priority, where i, j are integers representing numbers of the requests, and i<j. Initially on the first level, Requests 1, 2, . . . with the same high priority are grouped together and Request 1 is firstly selected by the RR method; Requests i, i+1, . . . with the same medium priority are grouped together and Request i is firstly selected by the RR method; and on the second level, Requests 1, i and j are selected in the order of their priorities using the SP method, and thus Request 1 with the high priority is output. At the end of the serving period of the power calculation engine 3073, Request 2 is selected by the RR method on the first level, and is further selected by the SP method on the second level, and thus Request 2 with the high priority is output, and so on. In the exemplary static scenario of FIG. 4(a), by means of such a two-level scheduling, Requests 1, 2, . . . , i, i+1, . . . , j are selected from the QoS scheduler 3071 one by one in their priorities, as shown in FIG. 4(b).

It should be understood that although FIGS. 4(a) and 4(b) show three priorities as an example for illustration, the present disclosure is not limited to this situation. Any number of priorities may be possible.

Although the QoS scheduling sequence of FIG. 4(b) shows an order of selecting the requests by the QoS scheduling mechanism of FIG. 4(a) in the static scenario, the QoS scheduling mechanism of FIG. 4(a) may also be applied to a dynamic scenario, in which the requests are continuously received over time. In the dynamic scenario, the QoS scheduler 3071 performs a new round of the two-level scheduling mechanism of FIG. 4(a) to select a new request for the power calculation engine 3073 every end/start of the serving period of the power calculation engine 3073.

FIG. 3 shows a simple example of QoS scheduling and power calculation in the power calculation core, in which there are a less number of requests with different priorities routed to the power calculation core 307 in a static scenario; and the power calculation of the samples corresponding to the request with a higher priority can be completed in the power calculation engine 3073 during its serving period, and then the QoS scheduler 3071 performs a new scheduling to select a request with a lower priority. However more generally, the power calculation core 307 may continuously receive a plurality of requests with the same and different priorities which is a dynamic process, and the power calculation of samples may be interrupted at the end of the serving period of the power calculation engine 3073 by a newly selected request with a priority higher than that of the request for power calculation of the samples.

Figure 5:
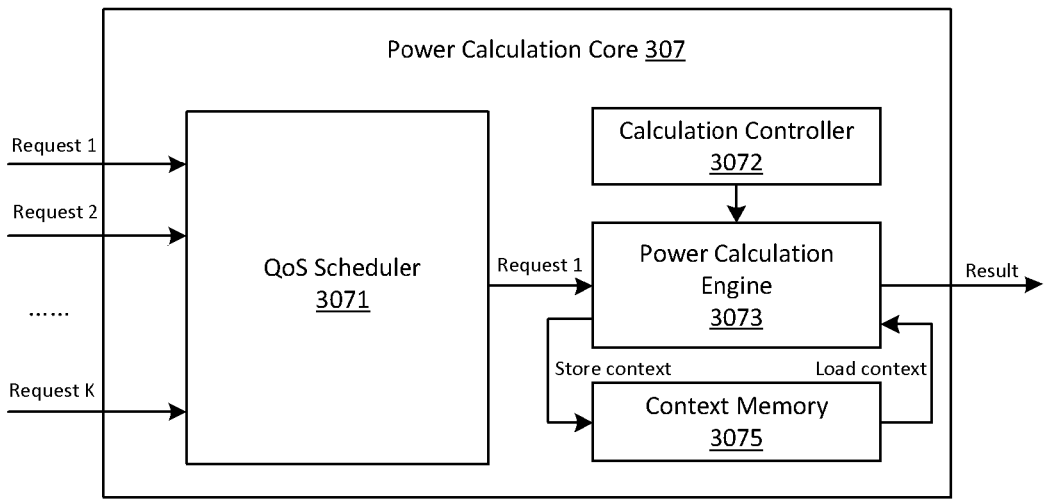
FIG. 5(a) illustratively shows a schematic structure diagram of a power calculation core in a centralized power meter according to an embodiment of the present disclosure.
FIG. 5(b) illustratively shows an exemplary QoS scheduling sequence output by the QoS scheduler in a centralized power meter according to an embodiment of the present disclosure.
Figure 5:

Hereinafter, an embodiment of the power calculation core 307 will be described in detail in connection with the more general example as discussed above with reference to FIG. 5(a). FIG. 5(a) illustratively shows a schematic structure diagram of a power calculation core 307 in a centralized power meter according to an embodiment of the present disclosure. Same reference numbers refer to elements which are same or similar to those elements in FIG. 3, and similar descriptions thereof may be omitted for simplicity.

As shown in FIG. 5(a), the power calculation core 307 may comprise a QoS scheduler 3071, a calculation controller 3072, a power calculation engine 3073 and a context memory 3075.

The QoS scheduler 3071 may schedule, at the end of the serving period of the power calculation engine 3073, the plurality of requests routed to the power calculation core 307 by the two-level QoS scheduling mechanism as previously described in conjunction with FIG. 4(a), so as to select a new request (e.g., Request 1) to be served by the power calculation engine 3073.

The context memory 3075 may store, from the power calculation engine 3073, the power calculation context for the request currently served by power calculation engine 3073, under the control of the calculation controller 3072.

The calculation controller 3072 may determine whether Request 1 is different from the request currently served by the power calculation engine 3073; control the power calculation engine 3073 to store power calculation context (i.e. an intermediate power calculation result) of the request currently served by the power calculation engine 3073 in the context memory 3075, if Request 1 is not the request currently served by the power calculation engine 3073, and to load power calculation context for Request 1 to the power calculation engine 3073 from the context memory 3075.

Here, it is possible that there is no power calculation context for Request 1 previously stored in the context memory 3075. In this case, no power calculation context is loaded from the context memory 3075 to the power calculation engine 3073.

The power calculation engine 3073 may perform power calculation of a next sample for Request 1 to resume the power calculation of the samples for Request 1, after power calculation context for Request 1 is loaded to the power calculation engine 3073 from the context memory 3075; or if the calculation controller 3072 determines that Request 1 is the request currently served by the power calculation engine 3073.

Hereinafter, an exemplary QoS scheduling and calculating process in the power calculation engine 307 of FIG. 5(a) will be described with reference to a QoS scheduling sequence of FIG. 5(b). At the beginning, Request K with a low priority is selected and power calculation of the samples corresponding to Request K is performed in the serving period of the power calculation engine 3073; at the end of the serving period, Request 1 with a high priority is selected by the QoS scheduler 3071, and the power calculation of the samples corresponding to Request K is interrupted by Request 1. Later, Request 1 and Request 2 are alternatively scheduled to be selected (here, assuming that Request 1 and Request 2 have the same high priority), and power calculations of the samples corresponding to Request 1 and Request 2 are alternatively performed in the successive serving periods of the power calculation engine 3073. After the power calculation of the samples corresponding to Request 1 is completed, the power calculation of the samples corresponding to Request 2 occupies the power calculation engine 3073 until the power calculation of the samples corresponding to Request 2 is completed. Then, the interrupted power calculation of the samples corresponding to Request N may be resumed and continue the rest power calculation.

Referring back to FIG. 4(a), the context memory 3075 may store the power calculation context of the samples for the request currently served per source from the power calculation engine 3073, under the control of the calculation controller 3071.

If the power calculation of all the samples from the source is completed, the context memory 3075 may clear the power calculation context of the samples for the currently served request per source, under the control of the calculation controller 3071.

Referring back to FIG. 3, the centralized power meter 300 further comprises a result memory 309 configured to store, per source, all of the power calculation results from the P power calculation cores 307-1 to 307-P. In particular, if the power calculation of all the samples from a source is completed, the result memory 309 may store the power calculation result from the corresponding power calculation core 307. A status indicator may be used for indicating that the power calculation result is ready, based on which the power calculation result of the source will be obtained.

The centralized power meter 300 according to the embodiments of the present disclosure may be approximately applied to any RF front end equipment.

Hereinafter, a centralized power calculation method according to an exemplary embodiment of the present disclosure will be described in detail with reference to FIGS. 6(a)-6(c).

The centralized power calculation method 600 may be performed by the centralized power meter 300 according to the embodiments of the present disclosure. The centralized power meter 300 at least comprises: M sample buffers 303-1 to 303-M, a switch 305, and P power calculation cores 307-1 to 307-P, wherein N, M and P are integers no less than 1, and N is no less than M, M is no less than P.

Figure 6:
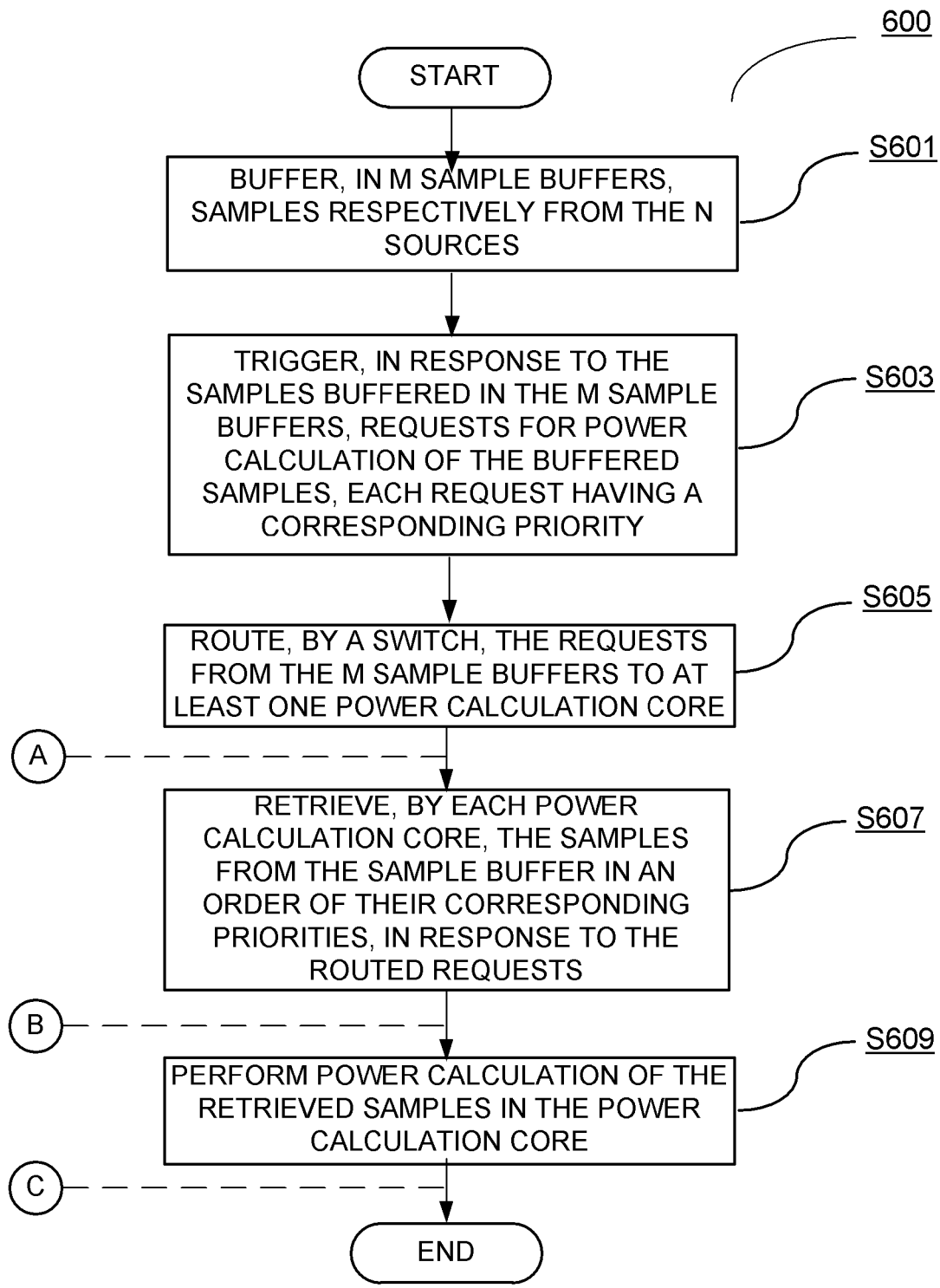
FIG. 6(a) illustratively shows a flowchart of a centralized power calculation method according to an exemplary embodiment of the present disclosure.
FIG. 6(b) illustratively shows a QoS scheduling and power calculation process of the centralized power calculation method of FIG. 6(a) according to an exemplary embodiment of the present disclosure.
FIG. 6(c) illustratively shows a QoS scheduling process of a centralized power calculation method of FIG. 6(a) according to an exemplary embodiment of the present disclosure.
Figure 6:
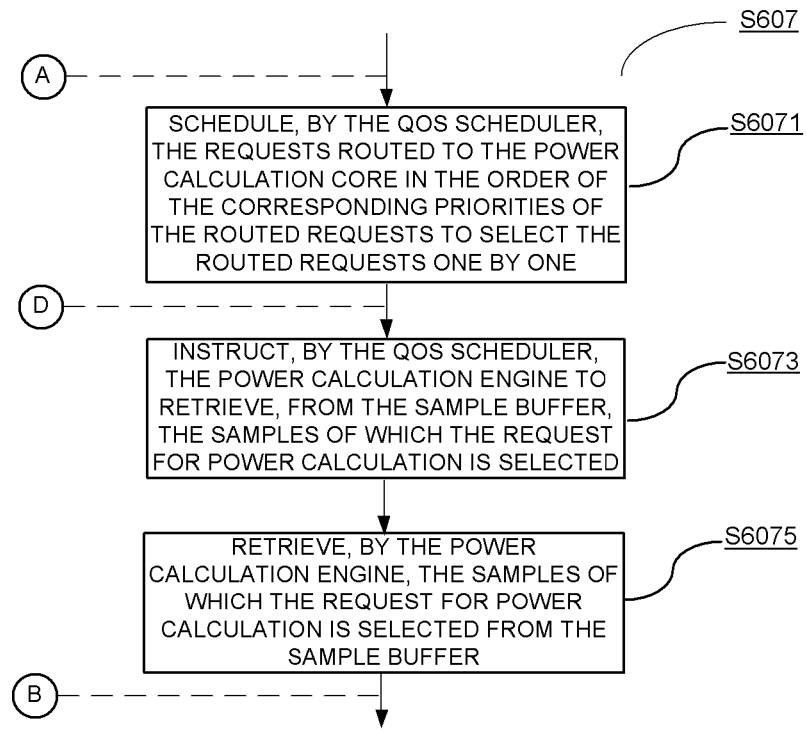
Figure 6:
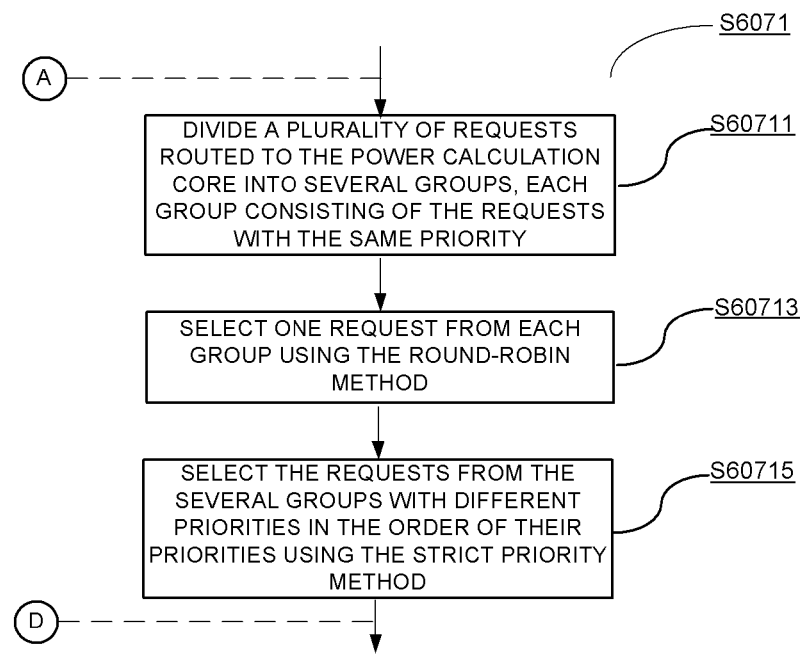

As shown in FIG. 6(a), the centralized power calculation method 600 for N sources may comprise:
step S601 of buffering, in the M sample buffers 303-1 to 303-M of the centralized power meter 300, samples respectively from the N sources;

step S603 of triggering, in response to the samples buffered in the M sample buffers 303-1 to 303-M, requests for power calculation of the buffered samples, each request having a corresponding priority;

step S605 of routing, by the switch 305 of the centralized power meter 300, the requests from the M sample buffers 303-1 to 303-M to P power calculation cores 307-1 to 307-P;

step S607 of retrieving, by each power calculation core 307 of the centralized power meter 300, the samples from the sample buffer 303 in an order of the corresponding priorities of the routed requests, in response to the routed requests; and step S609 of performing power calculation of the retrieved samples in the power calculation core 307.

In the centralized power calculation method 600, samples from a plurality of sources which are sampled in different time periods may share the same sample buffer 303.

In particular, the step S605 may comprise: routing the requests from the M sample buffers 303-1 to 303-M to a plurality of power calculation cores 307-1, . . . , 307-P according to a predefined (e.g., configurable) load balancing policy. In particular, the step S605 may comprise: establish, by the switch 305, a connection between the sample buffer 303 and the power calculation core 307 according to the load balancing policy, and routing the request received from the sample buffer 303 to the power calculation core 307 via the established connection.

It may be understood by the skilled in the art that in a specific example, there may be only one power calculation core 307 (i.e. P=1) in the centralized power meter, and all the requests from the M sample buffers 303 may be routed by the switch 305 to the power calculation core 307 with no load balancing policy needed.

The number P of the power calculation cores 307 depends on the capacity of the power calculation core simultaneously dealing with the requests from the M sample buffers 303.

As shown in FIG. 6(b), the step S607 may particularly comprise:

step S6071 of scheduling, by the QoS scheduler 3071 of the power calculation core 307, the requests routed to the power calculation core 307 in the order of the corresponding priorities of the routed requests to select the routed requests one by one; and step S6073 of instructing, by the QoS scheduler 3071, the power calculation engine 3073 to serve the selected request, which may comprise: retrieving, from the sample buffer 303, the samples of which the request for power calculation is selected, and performing the power calculation of the retrieved samples; and step S6075 of retrieving, by the power calculation engine 3073 of the power calculation core 307, the samples of which the request for power calculation is selected from the sample buffer 303.

In particular, the step S609 may comprise: performing, by the power calculation engine 3073, the power calculation of the retrieved samples.

As previously discussed, after the QoS scheduler 3071 selects the request for the power calculation engine 3073, the power calculation engine 3073 will generally serve the selected request for a predetermined period, which may be called as a serving period. During the serving period, the power calculation engine 3073 may retrieve the samples corresponding to the request from the sample buffer, and perform the power calculation of the retrieved samples.

In practice, the scheduling process of the QoS scheduler 3071 is much quicker than the serving period of the power calculation engine 3073. Therefore, it may be considered that the QoS scheduler 3071 performs a new round of scheduling to select a new request for the power calculation engine 3073 at the end/start of each serving period of the power calculation engine 3073.

With reference to the power calculation core 307-1 in FIG. 3, in this example, assuming that Request 1 has a higher priority and Request M has a lower priority, then the QoS scheduler 3071-1 may schedule, in step S6071, Requests 1 and M to firstly select Request 1 and instruct, in step S6073, the power calculation engine 3073-1 to serve Request 1 in the its serving period; and the power calculation engine 3073-1 may retrieve, in step S6075, the samples of Source 1 from the sample buffer 303-1 and perform, in step S609, the power calculation of the retrieved samples in its serving period. Then, at the end of the serving period, the QoS scheduler 3071-1 may repeat the step S6071 and S6073, i.e., the QoS scheduler 3071-1 may schedule, in step S6071, to select Request M and instruct, in step S6073, the power calculation engine 3073-1 to serve Request M in the next serving period; and accordingly, the power calculation engine 3073-1 repeats the step S6075 and S609 in its next serving period, i.e., the power calculation engine 3073-1 may retrieve, in step S6075, the samples from the sample buffer 303-M and perform, in step S609, the power calculation of the retrieved samples in its next serving period.

As previously described, the QoS scheduler 3071 included in the power calculation core 307 has a two-level scheduling mechanism. On the first level, a plurality of requests are divided into several groups, each group consisting of the requests with the same priority; and one request is selected from each group using a round-robin (RR) method; and on the second level, the requests from the several groups with different priorities are selected in the order of their priorities using a strict priority (SP) method. In such a way, the QoS scheduler 3071 may schedule, in the step S6071, the plurality of requests routed to the power calculation core 307 in the order of the corresponding priorities of the plurality of requests to select the plurality of requests one by one, in which the requests with the same priority are selected in the RR way.

Thus, as shown in FIG. 6(c), the step S6071 may particularly comprise:

step S60711 of dividing a plurality of requests routed to the power calculation core 307 into several groups, each group consisting of the requests with the same priority;

step S60713 of selecting one request from each group using the RR method; and step S60715 of selecting the requests from the several groups with different priorities in the order of their priorities using the SP method.

FIGS. 6(a)-6(c) shows a simple example of QoS scheduling and power calculation in the power calculation core, in which there are less requests with different priorities routed to the power calculation core 307 in a static scenario; and the power calculation of the samples corresponding to the request with a higher priority can be completed in the power calculation engine 3073 during its serving period, and then the QoS scheduler 3071 performs a new scheduling to select a request with a lower priority. However more generally, the power calculation core 307 may continuously receive a plurality of requests with the same and different priorities which is a dynamic process, and the power calculation of samples may be interrupted at the end of the serving period of the power calculation engine 3073 by a newly selected request with a priority higher than that of the request for power calculation of the samples.

Figure 7:
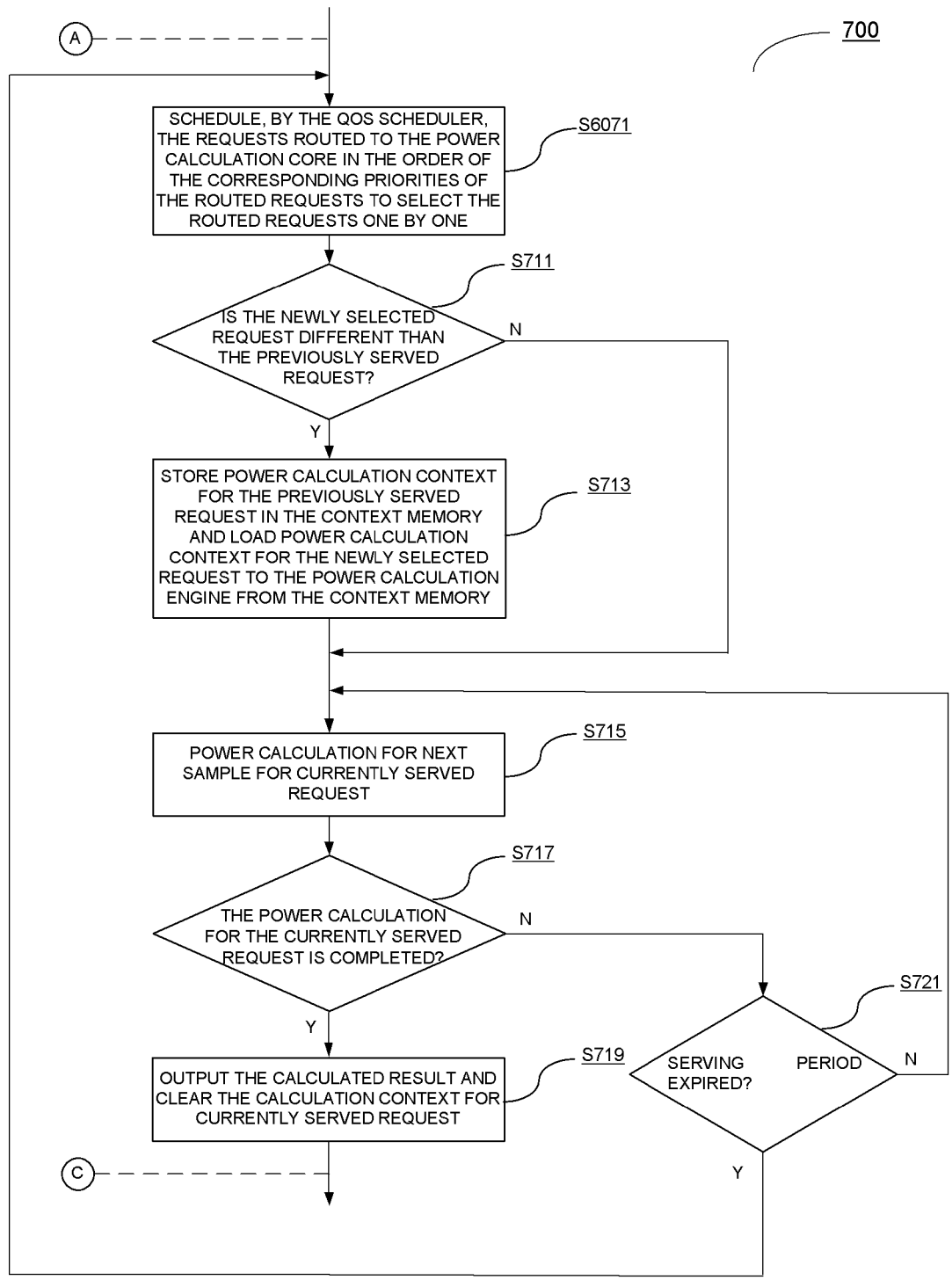
FIG. 7 illustratively shows a QoS scheduling and power calculation process of the centralized power calculation method of FIG. 6(a) according to an exemplary embodiment of the present disclosure.

Hereinafter, an embodiment of the QoS scheduling and power calculation process in the power calculation core 307 will be described in detail in connection with the more general example as discussed above with reference to FIG. 7 as well as FIG. 5(a). FIG. 7 illustratively shows another embodiment of steps S607 and S609 in the centralized power calculation method 600 of FIG. 6(a). In steps of FIG. 7, same steps as those in FIGS. 6(a)-6(c) use same reference numbers as in FIG. 6(a)-6(c) and similar descriptions thereof may be omitted for simplicity.

The QoS scheduling and power calculation process 700 is shown in FIG. 7.

In step S6071, the QoS scheduler 3071 may schedule, at the end of the serving period of the power calculation engine 3073, the plurality of requests routed to the power calculation core 307 by the two-level QoS scheduling mechanism as previously described in conjunction with FIGS. 4(a) and 6(c), so as to select a new request (e.g., Request 1) to be served by the power calculation engine 3073.

In step S711, the calculation controller 3072 may determine whether Request 1 is different from the request currently served by the power calculation engine 3073.

Assuming that the request currently served by the power calculation engine 3073 is Request K, the calculation controller 3072 may determine that Request 1 is not the request currently served by the power calculation engine 3073 ("Y" of step S711), and the process 700 goes to step S713, in which the calculation controller 3072 may control the power calculation engine 3073 to store power calculation context (i.e. an intermediate power calculation result) of Request K in the context memory 3075; and at the same time, the calculation controller 3072 may control the power calculation engine 3073 to load power calculation context for Request 1 to the power calculation engine 3073 from the context memory 3075.

Here, it is possible that there is no power calculation context for Request 1 being previously stored in the context memory 3075. In this case, no power calculation context is loaded from the context memory 3075 to the power calculation engine 3073.

After step S713, the power calculation engine 3073 may perform, in step S715 power calculation of a next sample for Request 1 to resume the power calculation of the samples for Request 1.

Then, the calculation controller 3072 may determine, in step S717, whether the power calculation of the samples for Request 1 is completed.

If the power calculation of the samples for Request 1 is completed ("Y" of step S717), the process 700 goes to step S719, in which the calculation controller 3072 controls the power calculation engine 3073 to output the power calculation result of Request 1 to the result memory 309, and to clear the power calculation context for Request 1 stored in the context memory 3075.

If the power calculation of the samples for Request 1 has not been completed yet ("N" of step S717), the process 700 goes to step S721, in which the calculation controller 3072 determines whether the serving period has expired.

If the serving period has expired ("Y" of step S721), the process 700 returns to step S6071 to perform a new round of scheduling.

If the serving period has not expired yet ("N" of step S721), the process 700 returns to step S715 to perform the power calculation of a next sample for Request 1.

It should be noted that in practical applications, the time periods (durations) of performing steps S6071, S711, S713, S717, S719 and S721 are typically much shorter than the time period (duration) of step S715, and thus may be ignored for the serving period. It is the time period of performing step S715 that mostly occupies the whole serving period of the power calculation engine 3073. Therefore, the serving period may be counted from step S6071, i.e., point A.

Generally, a smaller serving period makes the scheduling much fairer. On the other hand, the smaller serving period may lead to more frequent switching between the requests, and may result in a lower efficiency since each scheduling and context switching will take some time overhead. Therefore, the serving period may be predetermined by taking a tradeoff between the fairness of the scheduling and the time overhead into account.

On the other hand, if Request 1 is the request currently served by the power calculation engine 3073 ("N" of step S711), the process 700 proceeds to step S715, in which the power calculation engine 3073 performs power calculation of a next sample for Request 1 to continue the power calculation of the samples for Request 1.

The centralized power calculation method may further comprise: a step (not shown) of storing, per source, all of the power calculation results from the at least one power calculation cores in the result memory 309 of the centralized power meter 300.

And the centralized power calculation method may further comprise: a step (not shown) of clearing the power calculation context of the samples per source, once the power calculation of all the samples from the source is completed.

As will be understood by the skilled in the art, the above two steps may be performed simultaneously or in any order.

The technical solutions of the present disclosure may at least have beneficial effects of:
reducing the number of the power calculation cores in the circuit by sharing some of power calculation cores, so as to reduce the resource consumption (in particular chip resources consumption) and/or reduce the size of the circuit;
allowing flexible load balancing; and
ensuring QoS to different power metering sources.

The above is only the preferred embodiments of the present disclosure and the present disclosure is not limited to the above embodiments. Therefore, any modifications, substitutions and improvements to the present disclosure are possible without departing from the spirit and scope of the present disclosure.

What is claimed is:

1. A centralized power meter, comprising:
M sample buffers, each configured to buffer samples respectively from at least one of N sources, and trigger a request for power calculation of the buffered samples in response to the buffered samples, the request having a corresponding priority;
a switch, configured to route the requests from the M sample buffers to at least one power calculation core; and
the at least one power calculation core, each configured to retrieve the samples from the sample buffer in an order of their corresponding priorities, in response to the routed requests; and to perform power calculation of the retrieved samples,
wherein N and M are integers, wherein M is greater than 1, and N is no less than M.

2. The centralized power meter according to claim 1, wherein each power calculation core comprises a Quality of Service, QoS, scheduler and a power calculation engine, wherein
the QoS scheduler is configured to schedule the routed requests in the order of their corresponding priorities to select the routed requests one by one, and instruct the power calculation engine to serve selected request; and the power calculation engine is configured to retrieve, from the sample buffer, samples of which the request for power calculation is selected, according to the instruction of the QoS scheduler; and to perform the power calculation of the retrieved samples.

3. The centralized power meter according to claim 2, wherein the power calculation engine is further configured to retrieve, from the sample buffer, the samples of which the request for power calculation is selected and to perform the power calculation of the retrieved samples in a predetermined serving period of the power calculation engine; and the QoS scheduler performs a new round of scheduling to select a new request at the end of the predetermined serving period.

4. The centralized power meter according to claim 3, wherein the power calculation core further comprises a calculation controller and a context memory, wherein the calculation controller is configured to determine whether a second request which is newly selected by the QoS scheduler at the end of the predetermined serving period is different from a first request which is currently served by the power calculation engine; and if the second request is different from the first request, to control the power calculation engine to store power calculation context for the first request in the context memory, and control the power calculation engine to load power calculation context for the second request to the power calculation engine from the context memory; and the context memory is configured to store, from the power calculation engine, the power calculation context for the request currently served by power calculation engine, under the control of the calculation controller.

5. The centralized power meter according to claim 4, wherein the context memory is configured to store the power calculation context of samples for the currently served request per source under the control of the calculation controller; and to clear the power calculation context of the samples for the currently served request per source under the control of the calculation controller, once the power calculation of all the samples from the source is completed.

6. The centralized power meter according to claim 2, wherein the QoS scheduler is further configured to select the requests with the same priority in a round-robin way.

7. The centralized power meter according to claim 1, wherein samples from a plurality of sources which are sampled in different time periods share the same sample buffer.

8. The centralized power meter according to claim 1, wherein the switch is configured to route the requests from the M sample buffers to a plurality of power calculation cores according to a load balancing policy.

9. The centralized power meter according to claim 1, further comprising:

a result memory, configured to store, per source, all of the power calculation results from the at least one power calculation cores.

10. A centralized power calculation method for N sources, comprising steps of:

buffering, in M sample buffers, samples respectively from the N sources;

triggering, in response to the samples buffered in the M sample buffers, requests for power calculation of the buffered samples, each request having a corresponding priority;

routing, by a switch, the requests from the M sample buffers to at least one power calculation core;

retrieving, by each of the at least one power calculation core, the samples from the sample buffer in an order of their corresponding priorities, in response to the routed requests; and performing power calculation of the retrieved samples in the power calculation core, wherein N and M are integers, wherein M is greater than 1, and N is no less than M.

11. The centralized power calculation method according to claim 10, wherein each power calculation core comprises a Quality of Service, QoS, scheduler and a power calculation engine, and wherein the step of retrieving the samples from the sample buffer in the order of their corresponding priorities in response to the routed requests comprises:

scheduling, by the QoS scheduler, the routed requests in the order of their corresponding priorities to select the routed requests one by one; and instructing, by the QoS scheduler, the power calculation engine to serve selected request; and retrieving, by the power calculation engine, the samples of which the request for power calculation is selected from the sample buffer, according to the instruction of the QoS scheduler; and the step of performing power calculation of the retrieved samples comprises:

performing, by the power calculation engine, the power calculation of the retrieved samples.

12. The centralized power calculation method according to claim 11, wherein the steps of retrieving the samples of which the request for power calculation is selected and performing the power calculation of the retrieved samples are operated in a predetermined serving period of the power calculation engine; and the step of scheduling is performed to select a new request in a new round of scheduling at the end of the predetermined serving period.

13. The centralized power calculation method according to claim 12, wherein the power calculation core further comprises a calculation controller and a context memory, and wherein after the step of scheduling is performed to select a second request which newly selected by the QoS scheduler in the new round of scheduling at the end of the predetermined serving period, the centralized power calculation method comprises:

determining, by the calculation controller, whether the second request is different from a first request which is currently served by the power calculation engine;

controlling, by the calculation controller, the power calculation engine to store power calculation context for the first request in the context memory, and to load power calculation context for the second request to the power calculation engine from the context memory, if the second request is different from the first request;

performing, by the power calculation engine, power calculation of a next sample for the second request;

determining whether the power calculation of the samples for the second request is completed;

deciding whether the serving period has expired, if it is determined that the power calculation of the samples for the second request has not completed;

repeating the steps of performing, determining and deciding, until it is decided that the serving period has expired; and returning to the step of scheduling to select a new request.

14. The centralized power calculation method according to claim 13, wherein the power calculation context of samples for the currently served request is stored per source in the context memory; and wherein the centralized power calculation method further comprises:

outputting a power calculation result from the power calculation engine, and clearing, by the context memory, the power calculation context of the samples for the currently served request per source under the control of the calculation controller, if it is determined that the power calculation of the samples for the second request is completed.

15. The centralized power calculation method according to claim 11, wherein the step of scheduling the routed requests in the order of their corresponding priorities to select the routed requests one by one further comprises: selecting the requests with the same priority in a round-robin way.

16. The centralized power calculation method according to claim 10, wherein samples from a plurality of sources which are sampled in different time periods share the same sample buffer.

17. The centralized power calculation method according to claim 10, wherein the step of routing comprises:

routing the requests from the M sample buffers to a plurality of power calculation cores according to a load balancing policy.

18. The centralized power calculation method according to claim 10, further comprising:

storing, per source, all of the power calculation results from the at least one power calculation cores in a result memory.

* * * * *